United States Patent
Ku et al.

(10) Patent No.: US 9,407,775 B2
(45) Date of Patent: *Aug. 2, 2016

(54) METHOD AND APPARATUS FOR MANAGING CALLS

(71) Applicant: AT&T Intellectual Property I, LP, Atlanta, GA (US)

(72) Inventors: Bernard Ku, Austin, TX (US); Armstrong Soo, San Ramon, CA (US); Mehrad Yasrebi, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/227,866

(22) Filed: Mar. 27, 2014

(65) Prior Publication Data

US 2014/0211610 A1 Jul. 31, 2014

Related U.S. Application Data

(63) Continuation of application No. 13/112,234, filed on May 20, 2011, now Pat. No. 8,724,620.

(51) Int. Cl.
 *H04L 12/28* (2006.01)
 *H04M 7/00* (2006.01)
 *H04L 29/06* (2006.01)

(52) U.S. Cl.
 CPC ......... *H04M 7/0084* (2013.01); *H04L 65/1016* (2013.01); *H04L 65/1069* (2013.01); *H04M 7/0075* (2013.01)

(58) Field of Classification Search
 CPC ........... H04L 65/1016; H04L 65/1069; H04M 7/0075; H04M 7/0084
 See application file for complete search history.

(56) References Cited

U.S. PATENT DOCUMENTS

| | | | |
|---|---|---|---|
| 6,775,273 B1 | 8/2004 | Kung et al. | |
| 7,630,372 B1* | 12/2009 | Androski | .......... H04L 29/12594 370/349 |
| 8,724,620 B2* | 5/2014 | Ku | ...................... H04L 65/1016 370/349 |
| 2004/0193725 A1* | 9/2004 | Costa-Requena | ... H04L 65/1006 709/238 |
| 2006/0256790 A1 | 11/2006 | Kondou et al. | |
| 2007/0091879 A1 | 4/2007 | Croak | |
| 2008/0198804 A1* | 8/2008 | Rahman | ............ H04W 36/0011 370/331 |
| 2008/0247382 A1* | 10/2008 | Verma | ..................... H04L 65/80 370/352 |
| 2010/0083364 A1 | 4/2010 | Fernandez Gutierrez | |

* cited by examiner

*Primary Examiner* — Ayaz Sheikh
*Assistant Examiner* — Hai-Chang Hsiung
(74) *Attorney, Agent, or Firm* — Guntin & Gust, PLC; Atanu Das (57) ABSTRACT

A system that incorporates teachings of the present disclosure may include, for example, one or more components for receiving a call request at a first server from a first end user device, transmitting the call request from a first server to an intermediate server for establishing a voice or video call over an IP multimedia subsystem between the first end user device and a second end user device via a second server, and routing the voice or video call request from the first server to the second server using a second IP address when an undesired condition is determined to be associated with the IP multimedia subsystem. The second IP address can be obtained from a group of IP addresses stored in a memory of the first server and the group of IP addresses can be associated with other servers. Other embodiments are disclosed.

20 Claims, 6 Drawing Sheets

METHOD AND APPARATUS FOR MANAGING CALLS

CROSS-REFERENCE TO RELATED APPLICATIONS

This application is a continuation of and claims priority to U.S. application Ser. No. 13/112,234 filed May 20, 2011, the disclosure of which is hereby incorporated by reference in its entirety.

FIELD OF THE DISCLOSURE

The present disclosure relates generally to managing calls in a communication system.

BACKGROUND

Voice communications between end user devices rely upon a number of different network elements for completion of a call. A number of these network elements communicate with each other to provide necessary information for call processing. Failure of any of these network elements can result in a call processing failure.

DETAILED DESCRIPTION

One or more of the exemplary embodiments described herein allow for completion of voice and/or video communications between first and second end user devices despite an undesired condition in the network, such as a call processing failure in a network element. Session border controller devices can dynamically maintain Internet Protocol (IP) address information and end user device identification information at the session border controller devices throughout a network so that sessions can be initiated even when there is a determination of the undesired condition in the network. For example, a session border controller device can access the last updated Internet Protocol address associated with another session border controller device that corresponds to a callee's end user device to complete the call when the undesired condition is detected or otherwise determined. The last updated IP address can be accessed from a memory of the session border controller device or from another source, such as a remote server in a cloud computing configuration.

It should be further understood that the exemplary embodiments and/or portions thereof can be applied to initiation of sessions, regardless of what the actual sessions are for (such as the voice and video examples of sessions described herein).

The last updated IP addresses for each of the session border controller devices of a network, such as an IP multimedia subsystem network or a Long Term Evolution network, can be dynamically maintained and distributed throughout the network, such as through use of time stamps or other time indicia. For example, messages, such as call requests and/or responses to call requests, can include the latest IP address for the session control border server that forwards the message. A first session border controller device can obtain an IP address of a second session border controller device, as well as other information (e.g., a telephone number and/or a uniform resource indicator) associated with an end user device corresponding to the second session border controller device, based on receipt of messages during call flow processing. In this way, normal call processing dynamically may populate each of the session border controller devices with the last updated IP addresses of various other session border controller devices.

In one embodiment, headers can be inserted into the messages to carry the IP addresses and/or end user device identification information. In another embodiment, the session border controller devices can obtain the desired information from a header of a received message and then remove the header from the message before forwarding the message to the end user device.

One embodiment of the present disclosure includes a first session border controller device that includes a memory and a controller. The memory stores a group of IP addresses associated with a plurality of other session border controller devices. The controller is programmed to receive a call request from a first end user device and add a first IP address to the call request where the first IP address is associated with the controller. The controller is also programmed to transmit the call request over a network to an intermediate server for establishing a voice call between the first end user device and a second end user device, to determine when an undesired condition is associated with the network, and to determine a second session border controller device associated with the second end user device based on identification information of the second end user device. The controller is further programmed to route the voice call to the second session border controller device using a second IP address when the undesired condition is determined to be associated with the network. The second IP address is obtained from the group of IP addresses stored in the memory, and the second IP address is received by the controller from the second session border controller device when a previous voice call was established using the first and second session border controller devices. The second session border controller device is associated with the second end user device.

One embodiment of the present disclosure includes a non-transitory computer-readable storage medium comprising computer instructions to receive a call request at a first session border controller device from a first end user device, insert a first header into the call request using the first session border controller device where the first header comprises a first IP address associated with the first session border controller device, and transmit the call request from the first session border controller device over a network to an intermediate server for establishing a voice call between the first end user device and a second end user device via a second session border controller device. The computer instructions also provide for receiving a response to the call request at the first session border controller device from the second session border controller device and using the first session border controller device, retrieving a second IP address from a second header of the response to the call request. The second IP address is associated with the second session border controller device. The computer instructions further provide for transmitting the response to the call request to the first end user device.

One embodiment of the present disclosure is a method including receiving a call request at a first server from a first end user device, transmitting the call request from a first server to an intermediate server for establishing a voice call over an IP multimedia subsystem between the first end user device and a second end user device via a second server, and routing the voice call from the first server to the second server using a second IP address when an undesired condition is determined to be associated with the IP multimedia subsystem. The second IP address is obtained from a group of IP addresses stored in a memory of the first server. The group of IP addresses is associated with other servers of the IP multimedia subsystem. The second IP address is received by the first server from the second server when a previous voice call was established using the first and second servers. The second server is associated with the second end user device. Some of the various disclosed exemplary embodiments that are illustrated herein are described for Internet Protocol (IP) Multimedia Subsystem (IMS) and Long Term Evolution (LTE) networks for conciseness. However, persons skilled in the art recognize that the exemplary embodiments are applicable to other Voice Over IP (VoIP) networks, servers and/or configurations.

Figure 1:
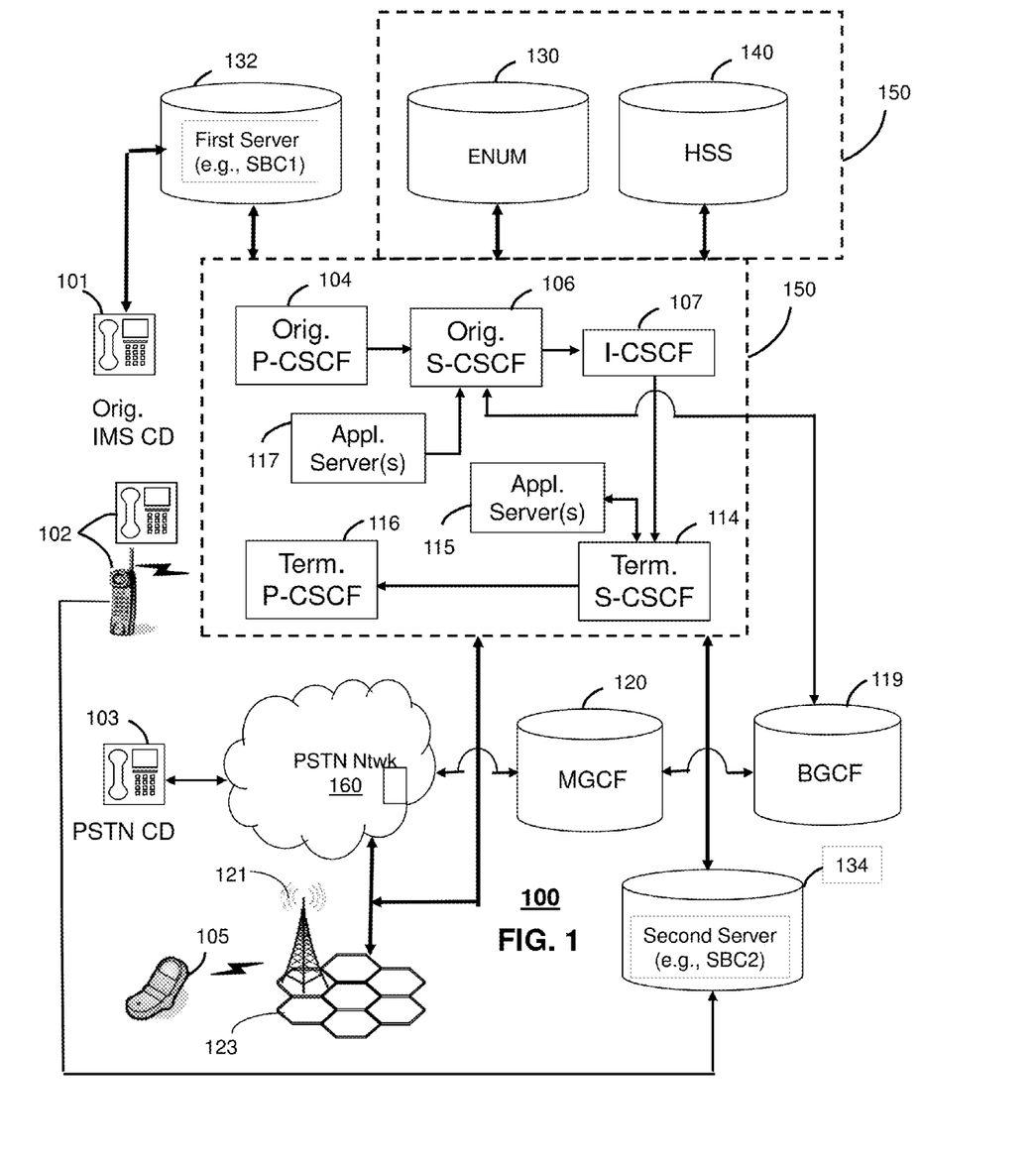
FIG. 1 depicts an illustrative embodiment of a communication system.

FIG. 1 depicts an illustrative embodiment of a communication system 100. The communication system 100 can be represented by a cellular communication network 123 with a plurality of base stations 121 that provide wireless communication services over an expansive geographic region such as a city, state, or nation. The cellular communication network 123 can operate according to wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), or Long Term Evolution (LTE), and so on. Other present and next generation wide area wireless network technologies are contemplated by the present disclosure.

Cellular phones supporting LTE can support packet-switched voice and packet-switched data communications and thus may operate as IP Multimedia Subsystem-compliant devices. In this embodiment, the cellular base station 121 can communicate directly with an IMS network 150—symbolically depicted by the bidirectional arrow between the cellular communication network 123 and the IMS network 150. The IMS network 150 is symbolically represented by the broken lines, and it should be understood that the network 150 can include more or less components than are depicted in FIG. 1. The IMS network 150 can include (as shown by the broken lines), or otherwise be coupled to, a Home Subscriber Server (HSS) 140, a tElephone NUmber Mapping (ENUM) server 130, and other common network elements of an IMS network 150. The IMS network 150 can establish communications between IMS-compliant communication devices (CDs) 101, 102, Public Switched Telephone Network (PSTN) CDs 103, 105, and combinations thereof by way of a Media Gateway Control Function (MGCF) 120 coupled to a PSTN network 160. The MGCF 120 is generally not necessary when a communication session involves IMS CD to IMS CD communications. A communication session involving at least one PSTN CD may utilize the MGCF 120.

IMS CDs 101, 102 can register with the IMS network 150 by contacting a Proxy Call Session Control Function (P-CSCF) which communicates with an interrogating CSCF (I-CSCF), which in turn, communicates with a Serving CSCF (S-CSCF) to register the CDs with the HSS 140. To initiate a communication session between CDs, an originating IMS CD 101 can submit a Session Initiation Protocol (SIP) INVITE (Invite) message to an originating P-CSCF 104 which communicates with a corresponding originating S-CSCF 106. The originating S-CSCF 106 can submit the SIP INVITE message to one or more application servers (ASs) 117 that can provide a variety of services to IMS subscribers.

Additionally, the originating S-CSCF 106 can submit queries to the ENUM system 130 to translate an E.164 telephone number in the SIP INVITE message to a SIP Uniform Resource Identifier (URI) if the terminating communication device is IMS-compliant. The SIP URI can be used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE message to the terminating S-CSCF 114. The terminating S-CSCF 114 can then identify a terminating P-CSCF 116 associated with the terminating CD 102. The P-CSCF 116 may then signal the CD 102 to establish Voice over Internet Protocol (VoIP) communication services, thereby enabling the calling and called parties to engage in voice and/or data communications. It is important to note that communications between an IMS CD 101 to a P-CSCF 104 can be through a First Server 132, which may be known as a Session Border Controller. Similarly, it is also important to note that communications between an IMS CD 103 to a P-CSCF 116 can be through a Second Server 134. Various functions may be combined and rearranged. For example, functions of First Server 132 and an Originating P-SCSF 104 may be realized in the same server, and functions of Second Server 134 and a Terminating P-SCSF 116 may be realized in the same server.

If the terminating CD is instead a PSTN CD such as CD 103 or CD 105 (for example, in instances where the cellular phone only supports circuit-switched voice communications), the ENUM system 130 can respond with an unsuccessful address resolution which can cause the originating S-CSCF 106 to forward the call to the MGCF 120 via a Breakout Gateway Control Function (BGCF) 119. The MGCF 120 can then initiate the call to the terminating PSTN CD over the PSTN network 160 to enable the calling and called parties to engage in voice and/or data communications.

In some instances the aforementioned communication process between IMS CDs is symmetrical. Accordingly, the terms "originating" and "terminating" in FIG. 1 may be interchangeable. It is further noted that communication system 100 can be adapted to support video conferencing. In addition, communication system 100 can be adapted to provide the IMS CDs 101, 102 with multimedia and Internet services. It is further contemplated that the CDs of FIG. 1 can be communicatively coupled to an access point such as a femtocell (not shown), a WiFi router, a DECT base unit, or another suitable wireless access point to establish communications with the IMS network 150 of FIG. 1. It is further noted that an originating IMS CD 101 and a terminating IMS CD 102 may be served by the same network devices. For example, a server (e.g., a First Server 132 or a Second Server 132) and a P-CSCF server (for example an Originating P-CSCF 104 or a Terminating P-CSCF 116).

The IMS network 150 and/or the cellular communication network 123 may also be communicatively coupled to one or more servers (only two of which are shown as servers 132 and 134), which may implement Session Border Controller (SBC) functions. SBC's 132 and 134 can receive call requests, such as invites including an E.164 telephone number, or responses to call requests from end user devices (e.g., devices 101 or 103). Each of the SBC's 132,134 can dynamically maintain the last updated IP addresses associated with other SBC's of the system 100 by obtaining the last updated IP addresses in the call requests or the responses to the call requests as calls are being processed by the SBC's 132,134. For example, the first SBC 132 can receive a response to a call request from the second SBC 134 where the response includes the last updated IP address associated with the second SBC 134. This IP address can be stored in a memory of the first SBC 132 in the event that the first SBC 132 needs to later route a voice or video call to an end user device that is associated with the second SBC 134. Similarly, the first SBC 132 can include its IP address in a call request being sent to the second SBC 134 so that the second SBC 134 can store the IP address of the first SBC 132 in the event that the second SBC 134 needs to later route a voice call to an end user device that is associated with the first SBC 132. Identification information associated with the end user devices, such as E. 164 telephone number and/or uniform resource indicators, can also be utilized by each of the SBC's 132,134 to determine the corresponding SBC through which the voice or video call can be routed.

System 100 allows for a determination of an undesired condition associated with the network, such as a call processing failure at a network element (e.g., ENUM 130 or S-CSCF 106), which could otherwise prevent completion of a voice or video call. For example, when an undesired condition is detected or otherwise determined to exist, an SBC 132 which is trying to process a voice or video call request from a user device (such as IMS CD 101) can route the voice or video call to the second SBC 134 for a user device associated with the second SBC 134 (such as IMS CD 102) based on the last updated IP address for the second SBC 134. Similarly, for example, when an undesired condition is determined to exist, an SBC 134 which is trying to process a voice or video call request from a user device (such as IMS CD 102) can route the voice or video call to the second SBC 132 for a user device associated with the second SBC 132 (such as IMS CD 101) based on the last updated IP address for the second SBC 132.

Figure 2:
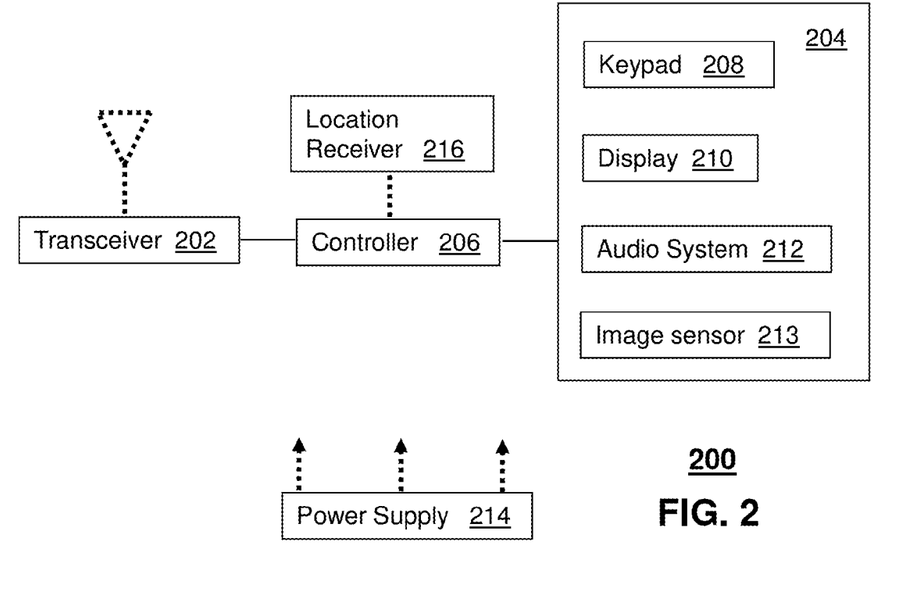
FIG. 2 depicts an illustrative embodiment of a communication device utilized in the communication system of FIG. 1.

FIG. 2 depicts an exemplary embodiment of a communication device 200. Communication device 200 can serve in whole or in part as an illustrative embodiment of the devices depicted in FIG. 1. The communication device 200 can function as a caller or callee's end user device that can participate in a completed voice and/or video call devices despite there being an undesired condition in the network through the dynamic maintaining of the last updated IP addresses and end user device identification information by the session border controller devices of the network, such as servers 132 and 134 of FIG. 1. The communication device 200 can comprise a wireline and/or wireless transceiver 202 (herein transceiver 202), a user interface (UI) 204, a power supply 214, a location receiver 216, and a controller 206 for managing operations thereof. The transceiver 202 can support short-range or long-range wireless access technologies such as Bluetooth, WiFi, Digital Enhanced Cordless Telecommunications (DECT), and/or other cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 202 can also be adapted to support circuit-switched wireline access technologies (such as PSTN), packet-switched wireline access technologies (such as various forms of IEEE 802.11 networking technologies, TCPIP, VoIP, etc.), and combinations thereof.

The UI 204 can include a depressible or touch-sensitive keypad 208 with a navigation mechanism such as a roller ball, a thumbwheel, a joystick, a mouse, or a navigation disk for manipulating operations of the communication device 200. The keypad 208 can be an integral part of a housing assembly of the communication device 200 or an independent device operably coupled thereto by a tethered wireline interface (such as a USB cable) or a wireless interface supporting for example Bluetooth. The keypad 208 can represent a numeric dialing keypad commonly used by phones, and/or a Qwerty keypad with alphanumeric keys used by smart phones. The UI 204 can further include a display 210 such as monochrome or color LCD (Liquid Crystal Display), OLED (Organic Light Emitting Diode) or other suitable display technology for conveying images to an end user of the communication device 200. In an embodiment where the display 210 is touch-sensitive, a portion or all of the keypad 208 can be presented by way of the display 210 with navigation features.

The UI 204 can also include an audio system 212 that utilizes common audio technology for conveying low volume audio (such as audio heard only in the proximity of a human ear) and high volume audio (such as speakerphone for hands free operation). The audio system 212 can further include a microphone for receiving audible signals of an end user. The audio system 212 can also be used for voice recognition applications. The UI 204 can further include an image sensor 213 such as a charged coupled device (CCD) camera for capturing still or moving images.

The power supply 214 can utilize common power management technologies such as replaceable and rechargeable batteries, supply regulation technologies, and charging system technologies for supplying energy to the components of the communication device 200 to facilitate long-range or short-range portable applications. The location receiver 216 can utilize common location technology such as a global positioning system (GPS) receiver capable of assisted GPS for identifying a location of the communication device 200 based on signals generated by a constellation of GPS satellites, thereby facilitating common location services such as navigation.

The communication device 200 can use the transceiver 202 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 206 can utilize computing technologies such as a microprocessor, a digital signal processor (DSP), and/or a video processor with associated storage memory such a Flash, ROM, RAM, SRAM, DRAM or other storage technologies.

The communication device 200 can be adapted to perform the functions of CDs 101, 102, 103 and 105 of FIG. 1. It will be appreciated that the communication device 200 can also represent other common devices that can operate in communication system 100 of FIG. 1.

Figure 3:
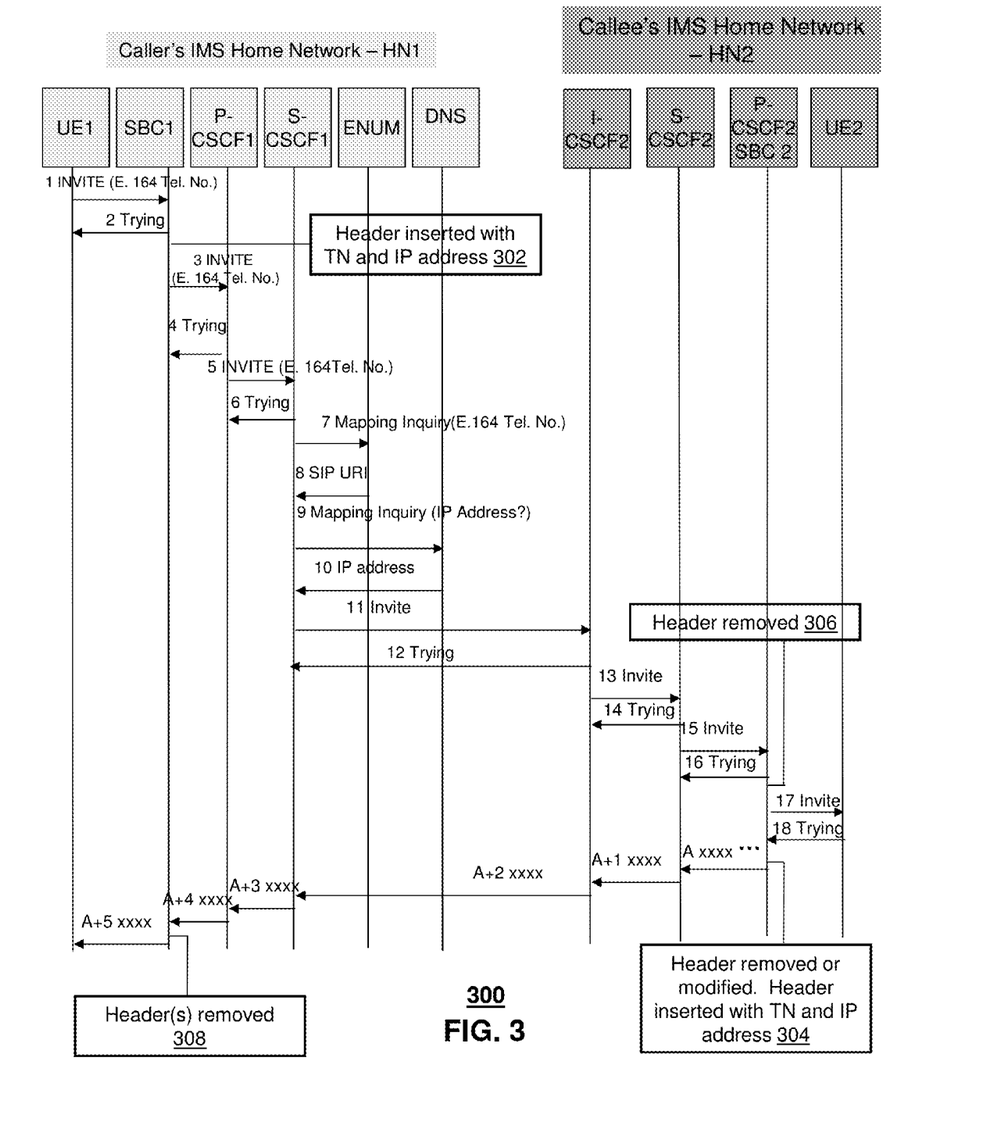
FIG. 3 depicts a call flow diagram of a communication system.

FIG. 3 depicts an illustrative embodiment of call processing 300 using an IMS network, such as network 150 of FIG. 1. Various components of the communication system 100 are shown such as the end user devices (UE1 and UE2), the SBC's, and the ENUM device. An additional component, a Domain Name Server (DNS) device is also shown and can be used to convert a device name into an IP address. It should be understood that one or more of these devices can be combined, such as the P-CSCF1 and the S-CSCF1. Other network components can also be used in call processing 300 and have not been shown in FIG. 3. UE1 may, for example, correspond to an IMS CD 101 of communication system 100 shown in FIG. 1 and UE2 may, for example, represent an IMS CD 102 of communication system 100 shown in FIG. 1. SBC1 may, for example, correspond to first server 132 of communication system 100 shown in FIG. 1. P-CSCF1 may, for example, correspond to P-CSCF 104 of communication system 100 shown in FIG. 1. S-CSCF1 may, for example, correspond to S-CSCF 106 of communication system 100 shown in FIG. 1 and S-CSCF2 may, for example, represent S-CSCF 114 of communication system 100 shown in FIG. 1. The ENUM device may, for example, correspond to ENUM 130 of communication system 100 shown in FIG. 1, while for conciseness the DNS device was not depicted in communication system 100 shown in FIG. 1, although it can be utilized with system 100. I-CSCF2 may, for example, correspond to I-CSCF 107 of communication system 100 shown in FIG. 1. For conciseness, an I-CSCF1 device was not depicted in communication system 100 shown in FIG. 1 or call processing 300, although it can be utilized with system 100 and/or call flow diagrams similar to the call processing 300. The P-CSCF2 and the SBC2 may, for example, correspond to P-CSCF 116 and SBC 134, respectively, of communication system 100 shown in FIG. 1, although they have been combined as an illustrative example that these two functions can be combined into a single component.

As described above with respect to FIG. 1, during normal call flow processing an Invite message can be originated from UE1 resulting in messages being transmitted from SBC1 to P-CSCF1 and then to S-CSCF1. A mapping inquiry or ENUM query can be transmitted from the S-CSCF1 to the ENUM device based on the Invite message. In response, the ENUM device may return a SIP URI (e.g., by searching tables) to replace the previous TEL URI or SIP URI in the Request-URI message. Routing of the SIP request can be based on the route header and when the route header is depleted, then the Request-URI can be utilized. An IP address can be returned from the DNS device and can be used at the TCP/UDP layer to route the message. The route header or Request URI may remain unchanged (i.e., not replaced with IP address). The series of messages can be transmitted between the various components through to the UE2 and then returned to the UE1, as depicted in the call processing 300 in order to complete a voice and/or video call in a normal call operating state. The exemplary embodiments also contemplate the use of other steps and/or the use of other network components in the normal call flow processing described herein.

Figure 4:
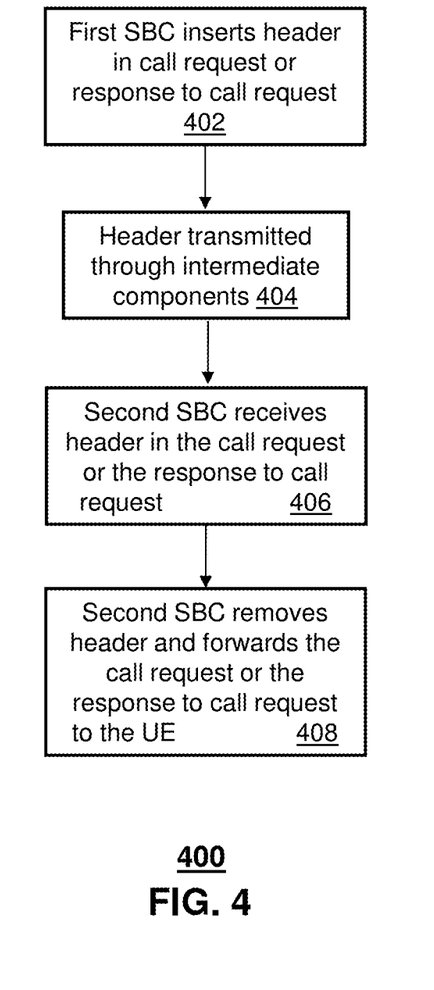
FIGS. 4-5 depict illustrative embodiments of method operating in portions of the systems and devices of FIGS. 1-3.

FIG. 4 depicts an illustrative method 400 that can operate in all or portions of the system and devices of FIGS. 1-2 in conjunction with the call processing of FIG. 3. At 402, the first SBC can insert a header into a message (e.g., a call request and/or a response to a call request) to be delivered to the second SBC. The header can include the last updated IP address for the first SBC. The header can also include additional information, such as an E. 164 telephone number and/or a uniform resource indicator for the user end device generating the call request and/or response to the call request. For instance, in call processing 300, SBC1 can receive a SIP Invite message from UE1 and can insert a header at 302 that includes the IP address of SBC1, as well as the telephone number of UE1. At 306 of FIG. 3, SBC2 can remove the header from SBC1, before forwarding the SIP Invite message to UE2. Similarly, SBC2 can receive the response message from UE2 and can insert the header at 304 of FIG. 3 that includes the IP address of SBC2, as well as the telephone number of UE2. Again, similarly, at 308 of FIG. 3, SBC1 can remove all such header information from SBC2 (and any header information that it may have inserted before), before sending the response A+5 xxxx to the SIP Invite message to UE1. "A" can be any appropriate number, depending on the number of messages that are shown. In the call processing 300, responses can be sent back progressively, and are represented in FIG. 3 with "xxxx" labels that would be understood by one of ordinary skill in the art.

It should be understood that although separate headers at 302 and at 304 are illustrated, a single header can be transmitted between SBC1 and SBC2 which can be adjusted to delete or modify old information and add new information, such as the IP address of SBC2. In another embodiment, multiple headers may be removed, such as at step 308, in case the implementation uses more than one header (e.g., in case, the header inserted by SBC1 is returned to it and SBC1 has to remove the header that it itself inserted as well as removing the header inserted by SBC2).

At 404, the message with its header can be transmitted through the intermediate network elements, such as P-CSCF1, S-CSCF1, ENUM device, DNS device, I-CSCF2, S-CSCF2, P-CSCF2, and so forth. At 406, the second SBC receives the message and can retrieve therefrom the IP address of the first SBC and identification information associated with the end user device generating the message, such as the call request from UE1 of network 300. This information can be stored in a memory of the second SBC for later routing of a voice or video call to the first SBC in the event of an undesired condition associated with the network 300. At 408, the second SBC can remove the header from the message and can forward the message without the header to the user end device. In this embodiment, SBCs add, modify and remove the described header information and headers, the end user devices do not receive the headers and thus would not store the IP addresses and/or other identification information and do not need to process such header information.

Time stamps and other indicia can be used with the IP addresses and/or with the identification information for the end user devices to facilitate a determination of the last updated information.

In another embodiment, a static version of an SBC database scheme can be utilized. For example, periodic polling or scanning of the SBCs can be utilized to populate each memory of the SBC with the last updated IP addresses of the other SBCs. In such an embodiment, information about all or just a subset of end user devices may be stored in the databases of one or more SBCs.

In one embodiment, the methods and systems described herein can be utilized for intra-service provider exchanges, where the SBCs (e.g., SBC1 and SBC2) are operated by the same service provider (e.g., AT&T). For example, an SBC can verify whether the call attempts are for the same service provider and not insert or return new headers if different service providers would be involved in the call processing. In one embodiment, address of each SBC may be a static address.

In another embodiment, the methods and systems described herein can be utilized for inter-service provider exchanges, where the SBCs (e.g., SBC1 and SBC2) are operated by different service providers. For instance, a pinhole or other communication technique could be used to interface between the network elements of the two service providers so that the IP address information and/or user end device identification information could be shared without exchanging other proprietary information.

In another embodiment, the dynamic distribution of last updated IP addresses can be enhanced by other techniques. For example, a remote server can also be provided with copies of all of the IP address and/or identification information. In the event that a first SBC is unable to identify an IP address in its memory for a second SBC then the first SBC could access the remote server to obtain the information. In another embodiment, the SBCs can periodically exchange IP addresses and/or other identification information directly with each other in addition to the dynamic technique described above.

In one embodiment, an SBC can select a subset of the stored information (e.g., a frequent called telephone number list, newest telephone numbers and so forth) such as if an SBC database becomes too large to manage.

Figure 5:
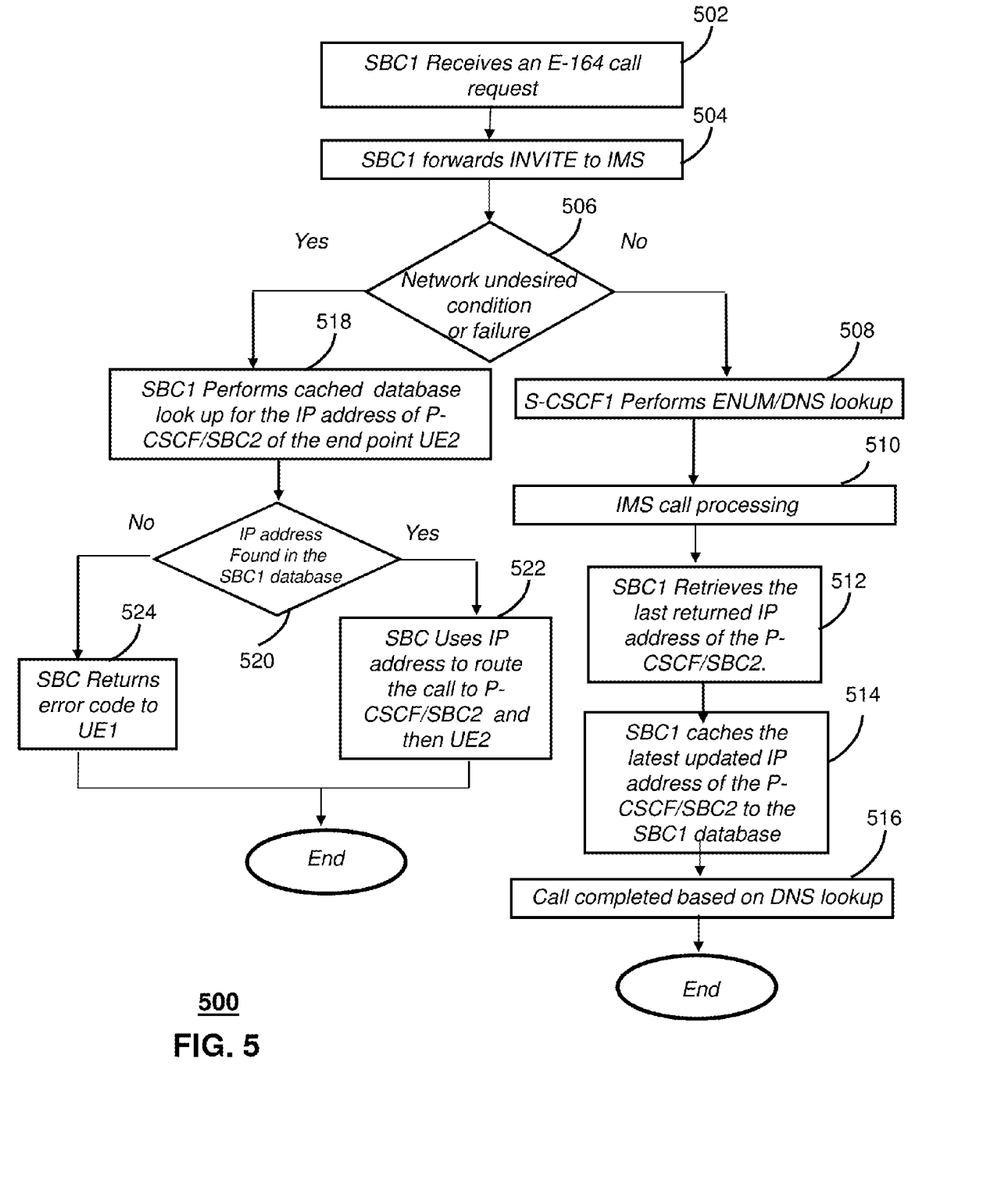

FIG. 5 depicts an illustrative method 500 that operates in portions of the systems and devices of FIGS. 1-3, and which can be combined with all or portions of method 400. At 502, SBC1 can receive a call request from an end user device (for example, UE1) where the request includes an identifier for the target end user device (e.g., UE2). An identifier can be an E. 164 telephone number. At 504, the SBC1 can forward an Invite message based on the E. 164 telephone number to the IMS network, such as a P-CSCF or other intermediate server. As described with respect to method 400, IP addresses and/or identification information can be included in the Invite message, such as through use of a header or other means.

At 506, a determination can be made as to whether the network is experiencing an undesired condition, such as associated with completing a voice or video call based on the Invite message. The undesired condition can be a call processing failure associated with the Invite message, such as the S-CSCF1 failing to process a mapping inquiry or the ENUM failing to process a SIP URI or the DNS failing to return a numeric IP address. In one embodiment, the SBC1 can determine the undesired condition based on receipt of a failure message, error message or other notification, including a SIP 503 service unavailable message.

In another embodiment, the undesired condition can be a condition other than a call processing failure. For example, the undesired condition can be a network status, such as the status of one or more network elements. For instance, even though a call could be completed via normal call processing through use of the mapping inquiry, SIP URI, return of an IP address and the other steps shown in FIG. 3, a determination can be made that an undesired condition exists. The undesired condition can be based on a number of different criteria, such as load on one or more network components, available resources of the network, a desire to re-distribute the load, and so forth. In one embodiment, a detection of an undesired condition for the network can be made by another device, such as a network monitoring server (not shown), where the server forwards notice to the SBC1. In another embodiment, the SBC1 can detect the undesired condition.

If an undesired network condition or network failure is not detected in step 506, control is transferred to step 508. At step 508, if there is no undesired condition, then the S-CSCF1 can perform normal call flow processing, such as an ENUM/DNS lookup, and other IMS call processing steps can be taken at 510 which are described in more detail in FIG. 3. At 512, the SBC1 can retrieve the last returned IP address of the SBC2 which is included in the response message received by the SBC1 as part of the call processing flow. At 514, the SBC1 can cache, or otherwise store in memory, the last updated IP address of the SBC2. By storing the latest IP address for SBC2, the SBC1 can dynamically maintain IP addresses for the SBC's of the network that SBC1 interacts with during normal call flow processing. At 516, the voice call can be completed based on the DNS lookup and other IMS normal call flow processing steps.

If on the other hand an undesired condition or network error is determined to be associated with the network at 506, then at 518 the SBC1 can access its memory to determine the last updated IP address for the SBC2 of the callee's end user device. The database information may have been stored earlier. At 520, if the IP address cannot be found then an error code can be returned to the caller's end user device at 524. In one embodiment, if the IP address for SBC2 is not stored in the memory of the SBC1, then SBC1 can send a request to a remote server for the IP address. The remote server can receive copies of the last updated IP address and/or end user device identification information from each of the SBCs, such as through each of the SBCs periodically providing copies of this information. In one embodiment, each of the SBCs can periodically provide their own last updated IP addresses and/or other end user device identification information, as well as this information for the other SBCs that have been dynamically stored in the memory of each of the SBCs, in order to provide a robust storage of this information at the remote server. Time stamps or other indicia of the most up-to-date information can be utilized so that older information can be discarded or otherwise ignored by the remote server when a request is received from an SBC.

If on the other hand, at step 520, the last updated IP address for SBC2 is stored in the memory of SBC1 then at 522 the SBC1 can route the voice call to SBC2 and UE2 utilizing the IP address of SBC2.

Upon reviewing the aforementioned embodiments, it would be evident to an artisan with ordinary skill in the art that said embodiments can be modified, reduced, or enhanced without departing from the scope and spirit of the claims described below. For instance, the IP addresses of the SBCs and/or the identification information for the end user devices can be added to, or otherwise provided with, the messages using other techniques in addition to or in place of headers. In one embodiment, the headers can include the IP addresses while the identification information for the end user devices is included directly in the messages.

Figure 6:
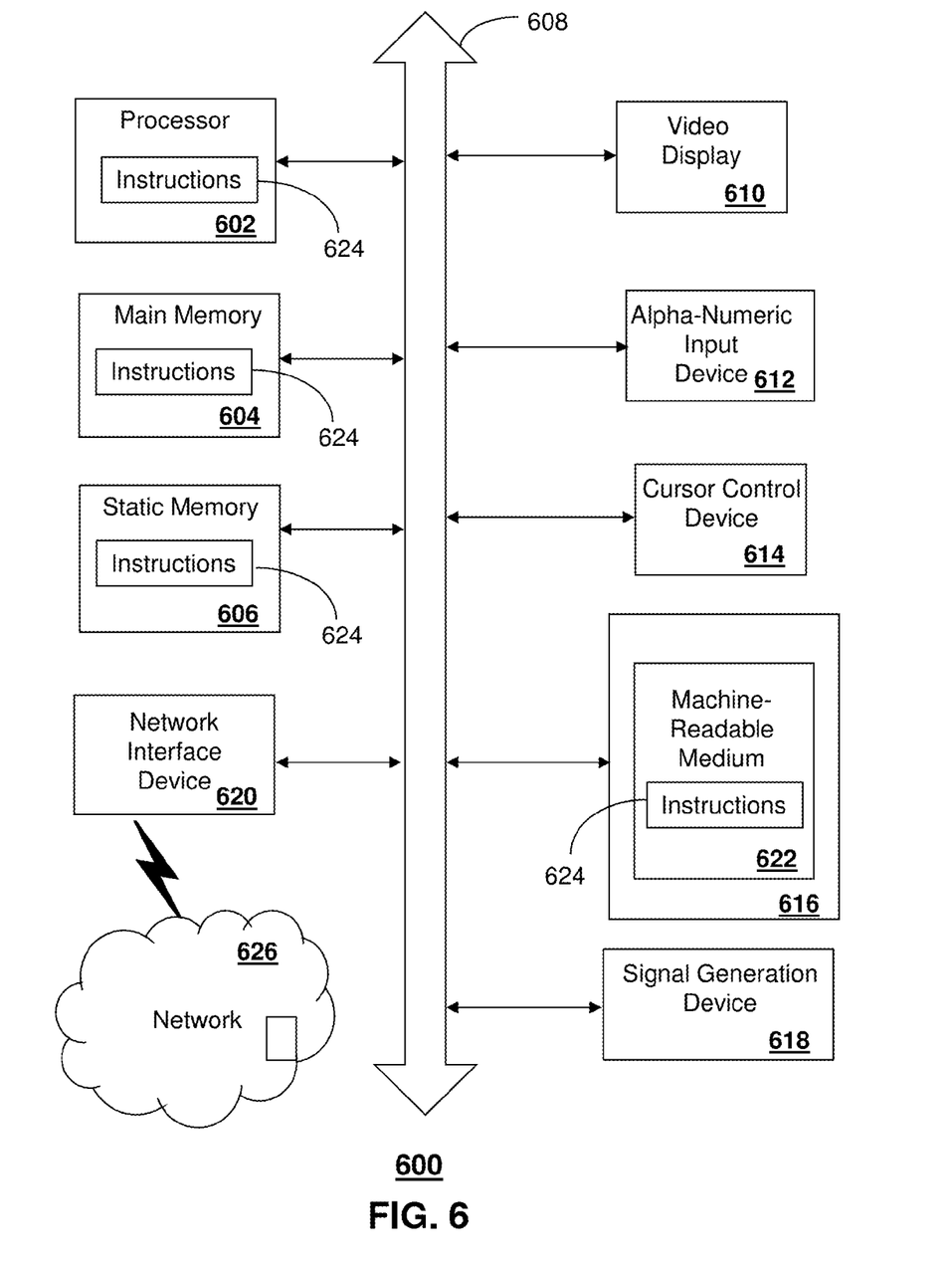
FIG. 6 is a diagrammatic representation of a machine in the form of a computer system within which a set of instructions, when executed, may cause the machine to perform any one or more of the methods disclosed herein.

FIG. 6 depicts an exemplary diagrammatic representation of a machine in the form of a computer system 600 within which a set of instructions, when executed, may cause the machine to perform any one or more of the methods discussed above. One or more instances of the machine can operate, for example, as the devices of FIGS. 1-2, including the SBC's 132 to insert and remove headers in call requests and/or responses to call requests, to store last updated IP addresses of other SBC's, to route calls to other SBC's in the event of a network undesired condition, and so forth. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, or a solid state display. The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first session border controller device, comprising:
a processor; and
a memory that stores executable instructions that, when executed by the processor, facilitate performance of operations, comprising:
transmitting a first IP address to a second session border controller device responsive to establishing a first call session with the second session border controller device, wherein the first IP address is stored by the second session border controller device, and wherein the second session border controller device transmits the first IP address derived from the first call session to a remote server that is accessible to a plurality of session border controller devices;
receiving a call request from the second session border controller device, wherein the call request is for a second call session, wherein the call request comprises the first IP address, wherein the call request is routed from the second session border controller device according to the first IP address responsive to determining an undesired condition at a network; and establishing the second call session with the second session border controller device.

2. The first session border controller device of claim 1, wherein the call request comprises a voice call, a video call, or a combination thereof.

3. The first session border controller device of claim 1, wherein the second session border controller device transmits the call request over the network to an intermediate server for establishing a call between a first end user device and a second end user device.

4. The first session border controller device of claim 1, wherein the second session border controller device identifies the first session border controller device based on identification information of a first end user device of the call request, wherein the first end user device is associated with the first session border controller device.

5. The first session border controller device of claim 1, wherein the first IP address is embedded into a header of the call request.

6. The first session border controller device of claim 5, wherein the header comprises a telephone number associated with an end user device of the second call session.

7. The first session border controller device of claim 1, wherein the undesired condition is a call processing failure associated with one of a domain name system device, an E.164 number mapping device, a serving call session control function device, or a combination thereof.

8. The first session border controller device of claim 1, wherein the undesired condition is not a call processing failure.

9. The first session border controller device of claim 1, further performing operations comprising removing a header from the call request to access the first IP address.

10. A non-transitory machine-readable storage medium comprising executable instructions that, when executed by a processor, facilitate performance of operations, comprising:
submitting a call request for a call session to an intermediate server of a network;
detecting an undesired condition on the network;
routing the call request to a first server using a first IP address responsive to the undesired condition, wherein the first IP address is obtained from a group of IP addresses, wherein the group of IP addresses is associated with other servers, and wherein the first IP address was received from the first server as part of a previous call session that was established with the first server;
establishing the call session with the first server; and
transmitting the first IP address obtained as part of the previous call session to a remote server for access by a plurality of servers.

11. The non-transitory machine-readable storage medium of claim 10, further performing operations comprising embedding the first IP address into a header of the call request.

12. The non-transitory machine-readable storage medium of claim 11, wherein the header comprises a telephone number associated with an end user device of the call session.

13. The non-transitory machine-readable storage medium of claim 11, wherein the header comprises a uniform resource identifier associated with an end user device of the call session.

14. The non-transitory machine-readable storage medium of claim 10, further performing operations comprising receiving the call request from an end user device.

15. The non-transitory machine-readable storage medium of claim 10, wherein the undesired condition is not a call processing failure.

16. The non-transitory machine-readable storage medium of claim 10, wherein the call request comprises one of voice call, a video call, or a combination thereof.

17. A method comprising:
transmitting, by a system comprising a processor, a call request to an intermediate server for establishing a call session over a network between a first end user device and a second end user device;
routing, by the system, the call request with a server using an IP address when an undesired condition is determined for the network, wherein the IP address is obtained from memory, and wherein the IP address was received from the server as part of a previous call session established with the server; and
sharing, by the system, the IP address that was received as part of the previous call session with a remote server that is accessible by a plurality of servers.

18. The method of claim 17, wherein the undesired condition is a call processing failure associated with one of a domain name system device, an E.164 number mapping device, a serving call session control function device, or a combination thereof.

19. The method of claim 17, wherein the undesired condition is associated with a status of the network and is not a call processing failure.

20. The method of claim 17, comprising inserting, by the system, a header into the call request, wherein the header comprises the IP address.

* * * * *